Figure 1:
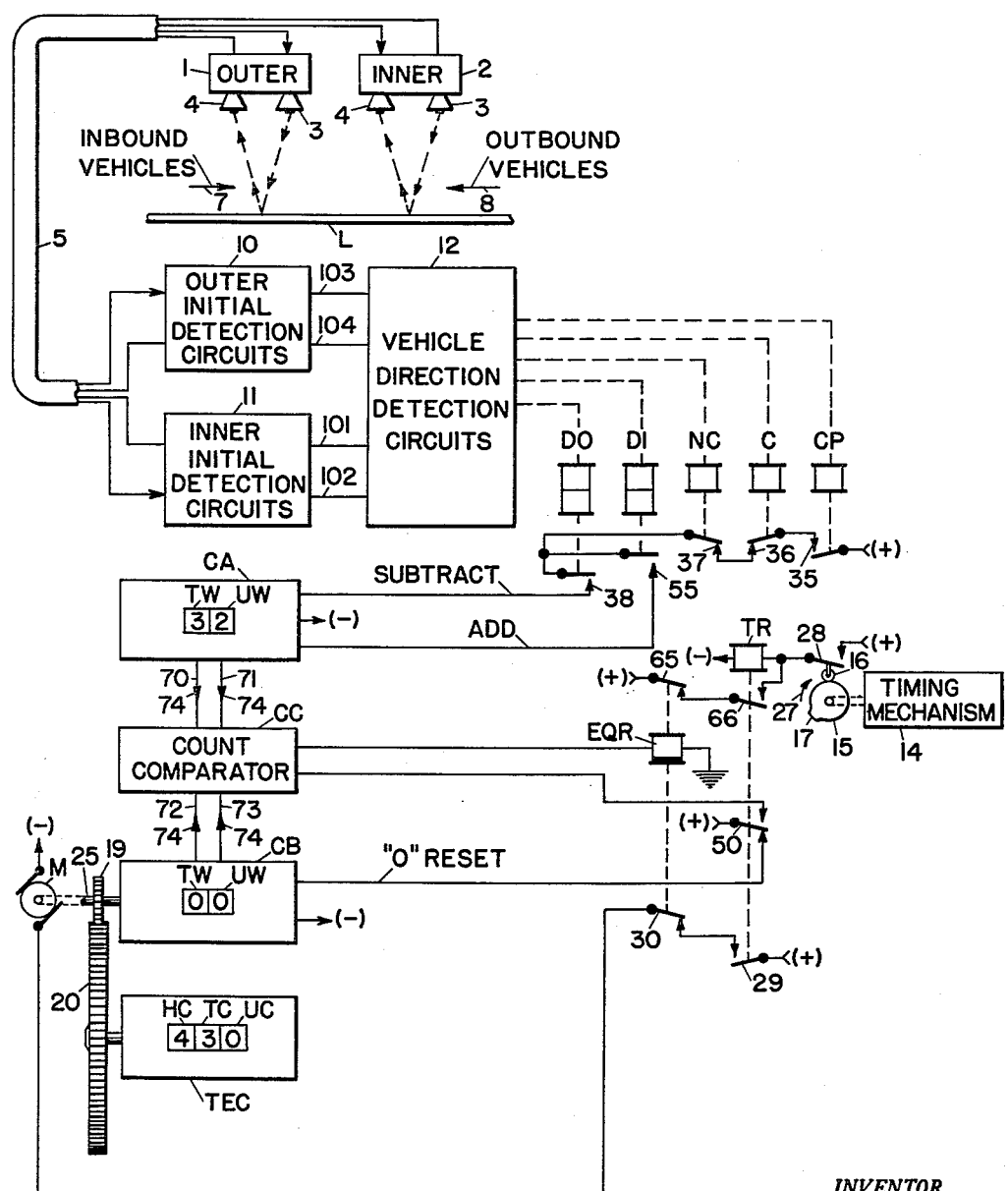

FIG. I.

INVENTOR.
N.A. BOLTON
HIS ATTORNEY

United States Patent Office 3,109,926
Patented Nov. 5, 1963

3,109,926
TOLL ESTIMATION SYSTEM
Norman A. Bolton, Scottsville, N.Y., assignor to General Signal Corporation, a corporation of New York
Filed Jan. 6, 1961, Ser. No. 81,160
6 Claims. (Cl. 235—92)

This invention relates to a toll estimating system and more particularly pertains to a system for estimating the parking fees that accrue with the passage of time for a varying number of vehicles in a parking lot or garage so that a continuing check may be made between the fees accruing throughout any given period of time and the amount of revenue actually received in that time.

In the present invention, a system is proposed for counting both the vehicles entering and leaving a confined parking area and applying the counts to a differential counter so that there is at each instance available a count which represents the number of vehicles then present in the parking area or garage. At regular intervals, a cumulative counter, which may be constructed to record accrued parking revenue in terms of dollars and cents, is controlled by the aforementioned differential counter so as to increase the amount registered on the cumulative revenue counter in accordance with the parking revenue accrued since the last recordation. Since the expected revenue rate for a parked car is known in terms of cents per hour parked, this rate may readily be converted to cents or mils per recording interval. As an example, if the parking revenue rate is thirty cents per car per hour, the equivalent of this is one-half cent per minute or five mils per minute. Thus, if the count registered upon the differential counter is sampled once each minute, then the parking revenue which has accrued since the last sampling time, one minute earlier, is the number of vehicles now present multiplied by five mils, and this is the amount which is then added to the cumulative counter.

It can be seen that an examination of the total revenue recorded upon the cumulative counter at the end of a day provides a quite close approximation as to the amount of money which should actually have been taken in during that time.

It is an object of this invention to provide a system for estimating the parking revenues which should have been collected in a parking facility such as a parking garage or parking lot for any predetermined time interval.

It is another object of this invention to provide a system wherein a differential counter receives different input counts corresponding respectively to entering and leaving vehicles and where the count registered upon this counter is sampled at regularly occurring intervals and cumulatively recorded to thereby record the revenue expected throughout any given interval.

Other objects, purposes, characteristic features of the present invention will in part be obvious from the accompanying drawings, and in part pointed out as the description of the invention progresses.

Figure 2:
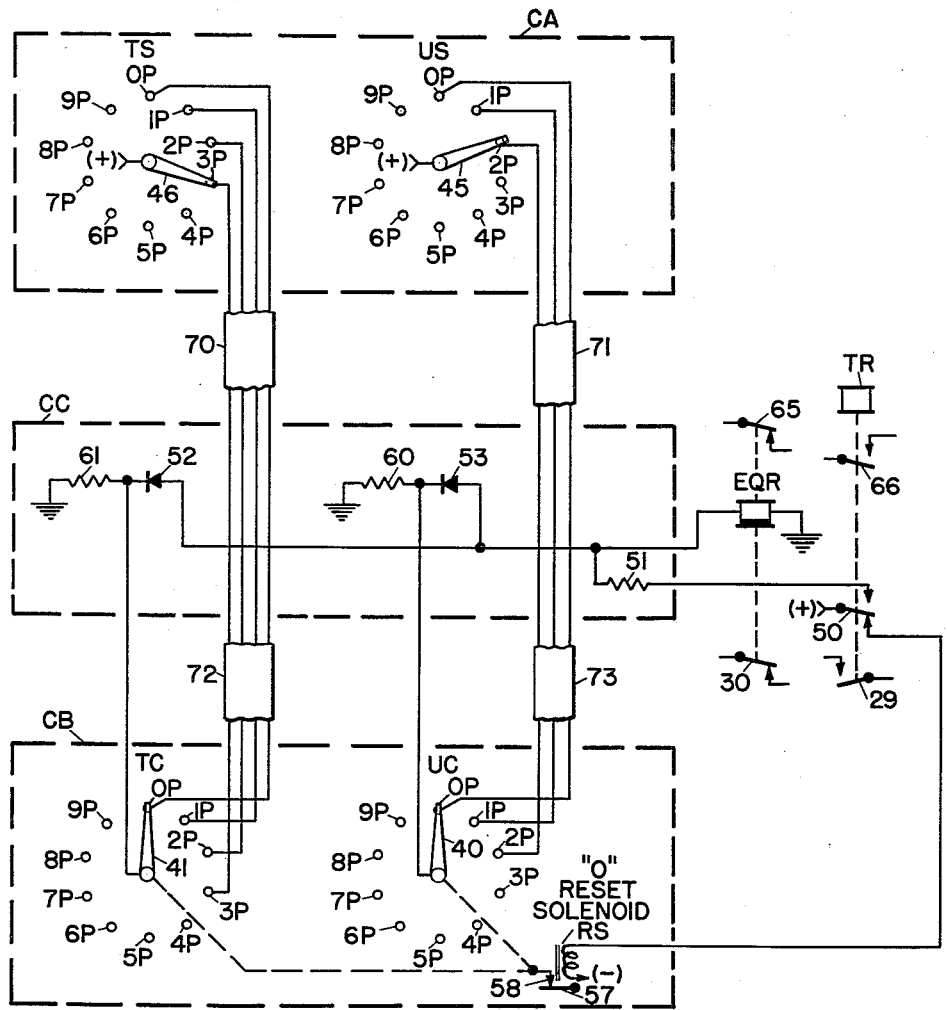

In describing the invention in detail, reference will be made to the accompanying drawings, in which like reference characters designate corresponding parts throughout the several views, and in which:

FIG. 1 is a joint block diagram and schematic diagram of one embodiment of this invention shown in relationship with a vehicle counting system; and FIG. 2 is a schematic diagram illustrating a portion of the embodiment of this invention in a more detailed manner.

The invention is shown as being applied to a parking area wherein one lane is employed for entrance and exit of vehicles. A system for counting vehicles entering into and exiting from such parking area is shown in FIG. 1 but a more complete disclosure of the Directional Traffic Control System employed herein may be had by referring to my copending application, Ser. No. 820,225, filed on June 15, 1959.

In FIG. 1, two adjacent ultrasonic transducer units 1 and 2 are mounted over the single traffic lane L over which inbound and outbound vehicles normally travel in the directions indicated by arrows 7 and 8 respectively. Outer unit 1 and inner unit 2 each includes a transmitting transducer 3 and a receiving transducer 4 which are electrically connected by cable 5 to electronically controlled apparatus located at a central office. The outer unit 1 is connected through cable 5 to outer initial detection circuit 10, while inner unit 2 is connected through cable 5 to inner initial detection circuit 11. Circuits 10 and 11 distinguish the pulses of ultrasonic energy received from respective receiving transducers 4 according to the presence or absence of a vehicle and the direction thereof.

According to the operation of circuits 10 and 11, vehicle direction detection circuits 12 are controlled according to outputs supplied over wires 101–104 as described in the above mentioned application, Ser. No. 820,225. The vehicle direction detection circuits 12 control the direction out relay DO, the direction in relay DI, the no-count relay NC, the count relay C and the count repeater relay CP as described in the above mentioned pending application Ser. No. 820,225, and need not be considered further in detail herein. Described briefly, for each inbound vehicle, relay DI is dropped away, and for each outbound vehicle, relay DO is dropped away. Concurrently with the actuation of either relay DO or DI, relays C and CP are dropped away in succession, but relay NC ordinarily remains dropped away and is picked up only for special reasons as described in the copending application Serial No. 820,225. Because of the sequential actuation of relays C and CP, a circuit is closed for a brief interval through closed back contact 36 and closed front contact 35 as well as through back contact 37 of relay NC and through one or the other of back contacts 38 or 55 of relays DO or DI respectively to supply either a subtract count or an add count to the differential counter CA.

The counter CA may be of the differential type and including a coil which when energized will add a count and including another coil which when energized will subtract a count. With this type of counter, and the Directional Traffic Control System as shown, an accurate count of vehicles within the assumed parking area can be maintained.

Intermittently, such as once a minute, for example, the timing mechanism 14 samples the differential count then registered on counter CA in order to estimate the parking revenue that has accrued since the last sampling. To effect this intermittent sampling, the timing mechanism 14 includes a cam 15 which rotates with a constant angular velocity so that the projection 17 at regular intervals pushes the roller 16 upwardly to thereby close contact 28 and energize relay TR. Each time that relay TR is picked up by the closure of contact 28, a stick circuit is completed through closed back contact 65 of relay EQR and front contact 66 of relay TR to maintain relay TR energized even though contact 28 is shortly thereafter opened as cam 15 continues its rotation. As soon as relay TR picks up, a circuit is completed through its front contact 29 and through back contact 30 of relay EQR to energize motor M. Motor M then rotates shaft 25 thereby operating counter CB until the count registered thereon matches the count which is then stored in counter CA. Comparison of the counts stored respectively in counters CB and CA is made by the count comparator CC which energizes relay EQR as soon as parity between counter registrations is obtained. When this happens, the energization circuit for motor M is interrupted at open back contact 30 of relay EQR and relay TR is restored to its normal deenergized condition by the opening of back contact 65.

A toll estimation counter TEC is adapted to be mechanically connected to counter CB through a multiplying translation gear arrangement including gears 19 and 20 provided for establishing the toll charge per vehicle. Each time that motor M is energized to operate counter CB so that the count registered thereon matches that which is then stored in counter CA, the counter TEC has its reading increased by an amount which is directly proportional to the amount by which counter CB has been driven, but the amount added to counter TEC, as a result of the gear ratio employed between gears 19 and 20, represents the parking revenue accrued since the last measuring interval rather than merely the number of cars then parked. A "0" reset solenoid RS is provided to control counter CB to a zero position upon the release of relay TR and the closure of its back contact 50.

It is believed that the nature of the invention, its advantages and characteristic features can be best understood with further description being set forth from the standpoint of operation.

*Operation*

With reference to FIGS. 1 and 2, a typical operation thereof will be now described for which assumptions will be presently made. Under normal operating conditions, however, certain normal conditions prevail which should be described initially.

With respect to the counter CA, a number or count will be normally displayed by units and tens indicating drums UW and TW. In the present case, the number 32 is displayed by counter CA. Units and tens indicating drums UW and TW of counter CB normally display a "zero" except when they are operated to correspond to the positions of the corresponding indicating drums of counter CA. The toll estimation counter TEC normally displays the cumulative toll charge on indicating drums UC, TC and HC for the respective units, tens and hundreds digits. Counter CB is so constructed that it will be reset to the zero position when energized through closed back contact 50 of relay TR, and this resetting occurs even though motor M is not in operation so that shaft 25 is not rotatable.

It should be understood that any number of windows and indicating drums may be included with each counter according to particular applications of this invention.

For purposes of description, let it be assumed that, during an intermediate time interval, two vehicles exit from the parking area. Also, let it be assumed that the toll charge for parking in the area is set at thirty cents per vehicle per hour and that the timing mechanism 14 causes cam 15 to make a complete revolution in one minute. Under these assumptions, the present invention as illustrated in FIGS. 1 and 2 will estimate the toll charges for the vehicles within the area once each minute.

When each of the two vehicles exits from the parking area over lane L, a pulse of energy will be applied to the subtract coil (not shown) of counter CA.

As already described, the timing mechanism 14 will, for each revolution of cam 15, close contact 28 and thereby energize relay TR. This will energize motor M and cause counter CB to be operated from its zero position.

Referring more particularly to FIG. 2, detailed circuits for the counters CA and CB and the count comparator CC are shown to illustrate the manner in which the counts registered on counters CA and CB are adapted to effect control of count comparator CC. With counter CA, switches are provided which are shown schematically and designated US and TS. These switches are associated with the indicating drums UW and TW respectively and are provided for the purpose of effecting an electrical read out of the respective indicating positions of such indicating drums in the well known manner. Similarly, counter CB also includes a plurality of connector switches shown schematically and designated UC and TC. These connector switches UC and TC are associated respectively with the indicating drums UW and TW and are similarly provided for the purpose of effecting an electrical read out of the respective indicating positions of such indicating drums for counter CB. More particularly, the connector switches UC and TC are adapted to control the energization of relay EQR while a comparison of counts is being effected.

With motor M now being energized, arms 40 and 41 of the respective connector switches UC and TC are controlled to the different connector positions 0P–9P according to the rotation of shaft 25 and the operation of the internal gear arrangement (not shown) for counter CB. More specifically, the motor drive will act directly upon the units drum UW of counter CB and an internal gear arrangement of the counter will then cause the tens drum TW to advance one digit for each complete revolution of the units drum UW. In a similar manner, the switch 41 shown in FIGURE 2 will operate from one position to the next only when the switch 40 has made a complete revolution. The rotation thereof will continue until the position of switches 40 and 41 of counter CB exactly matches that of the respective switches 45 and 46 of counter CA. At such time, relay EQR will be energized and this will deenergize the motor because of the then-open back contact 30 of relay EQR. Further rotation of shaft 25 ceases so that counter CB then remains, at least for a time, in the position where its count matches that registered on counter CA.

Since the two vehicles have left the parking area as assumed above, the counter CA will now display the count 30. Thus, arm 46 for counter CA would be in the position as shown in FIG. 2, while arm 45 for counter CA would now be in the connector position 0P. An energizing circuit is provided for relay EQR, but this circuit can only be effective when the counter CB has been driven by the motor to the position where the count registered therein exactly matches that stored in counter CA. This circuit for relay EQR includes front contact 50 of relay TR, resistor 51 and the winding of relay EQR. Two parallel shunt paths are further provided in this circuit, one extending through diode 53 and resistor 60 to ground, and a similar circuit extending through diode 52 and resistor 61 to ground. In parallel with resistor 60 is a series circuit which extends through contact 40 of counter CB and is completed through contact 45 of counter CA only provided that both contacts 40 and 45 are in the same relative positions. If this latter condition is not met, this series circuit paralleling resistor 60 is open and the shunt resistance provided by resistor 60 is then sufficiently low so that insufficient energy can be applied to the winding of relay EQR to pick this relay up. A similar arrangement exists with respect to resistor 61 and either of these resistances provides a sufficiently low shunting resistance relative to the winding of relay EQR that actuation of the relay cannot occur so long as either or both of these shunt paths are effective. It is obvious, however, that the motor M will eventually drive counter CB to a position where contacts 40 and 41 are in the same relative positions as the respective contacts 45 and 46. When this occurs, the junction of resistor 60 and diode 53 is connected to the (+) source of energy through the contacts 40 and 45 and, at the same time, the junction of resistor 61 and diode 52 is connected to the (+) source of energy through contacts 41 and 46. It is only under these circumstances that the shunting circuits are ineffective so that a high level of energization can be applied to the winding of EQR to pick it up.

With relay EQR being energized, the energizing circuit for motor M including back contact 30 of relay EQR is disconnected. During the deenergized period of EQR, a stick circuit for relay TR was established from (+), through back contact 65 of relay EQR, through front contact 66 of relay TR, through the winding of relay TR, to (−). During the rotation of the shaft 25 by motor M, the multiplying translation gear arrangement including gears 19 and 20 is effective to cause the counter TEC to register the proper toll charge for each vehicle representative of the count displayed on counter CA. In view of the above assumptions, the toll charge for each vehicle registered would be registered as 5 mils. At the conclusion of operation for counter TEC, the toll charge registration thereon would be sixty-five cents in excess of the amount of four dollars and thirty cents now displayed thereon.

Following the energization of relay EQR, a stick circuit including back contact 65 of relay EQR for maintaining relay TR energized is disconnected. The subsequent deenergization of relay TR causes an energizing circuit for "0" reset solenoid RS to be completed for effecting a "0" reset of counter CB. This circuit extends from (+), through back contact 50 of relay TR, through the winding of "0" reset solenoid RS, to (−).

As schematically illustrated in FIG. 2, solenoid RS in its energized condition is adapted to cause an associated contact 57 to engage a plurality of cams as represented by arrow 58, one for each of the indicating drums shown in windows UW and TW for counter CB. Each of the plurality of cams (not shown) is formed in a manner such that contact 57 in its up position (as shown in FIG. 2) causes each of the associated indicating drums to return to the "0" indicating position with the associated connector switches being in correspondence therewith. Thus, counter CB is effectively reset to a "0" display position in readiness for operation during the next succeeding time interval.

These operations as described above are repetitive in nature according to the selected time intervals as determined by the timing mechanism 14. In the specific embodiment shown and described, a "scanning" rate of once each minute has been assumed, but obviously other time intervals may equally well be used. In general, the higher the scanning rate the more accurate the estimate will be, but a high rate of scanning is, of course, unnecessary when there are only relatively gradual changes in the number of vehicles within the parking area.

Having described a toll estimation system, as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to make the requirements of practice, without in any manner departing from the spirit or scope of the present invention.

What I claim is:

1. In a system for estimating the parking revenues accruing with the passage of time for the variable number of vehicles occupying a defined parking area the combination comprising, vehicle detection means distinctively responsive to each vehicle entering and also each vehicle leaving said parking area, digital differential counting means governed by said vehicle detection means for registering at each instant the total number of vehicles occupying said parking area, cumulative digital counting means, timing means effective at predetermined intervals to control said cumulative counting means to add to the count already registered thereon an amount proportional to the number of vehicles then in said parking area as determined by said differential counting means.

2. The system of claim 1 wherein the count added to said cumulative counting means equals the accrued parking revenue for the number of vehicles at that instant registered by said differential counting means as being in said parking area over the length of time of said predetermined interval.

3. A system for estimating parking revenues accruing with the passage of time for a variable number of vehicles parked within a garage or other parking area, digital means differently responsive to each vehicle entering and each vehicle leaving said parking area to thereby register at each instant the exact number of vehicles in said parking area, a second digital counter being operated at regular intervals from a re-set condition to a condition where its registered count corresponds exactly with that which is then registered in said differential counting means, and digital cumulative counting means governed by said second digital counter and being operated each time said second counter is operated by said timing means to add to the count already stored in said cumulative counting means an amount proportional to the number of vericles then in said parking area.

4. The system of claim 3 which includes timing means for operating said second digital counter at regular predetermined intervals to a condition where the count registered therein exactly equals that registered in said digital differential counting means and including correspondence checking means to stop operation of said second digital counter when its registration is identical with that of said differential counting means.

5. The system of claim 4 in which said correspondence checking means includes at least one contact in both said second digital counter and said cumulative counter each operated to a different position for each different count registered on the respective counter, and circuit means including said contacts for stopping operation of said second digital counter only when said contacts for the respective differential counting means and said second digital counter are in correspondence.

6. The system of claim 5 including means operative when said second digital counter has been operated to a condition of correspondence with said digital differential counting means to re-set said second digital counter to a zero re-set condition without affecting the count then registered in said cumulative counting means.

References Cited in the file of this patent

UNITED STATES PATENTS

| | | |
|---|---|---|
| 1,338,715 | Welsch | May 4, 1920 |
| 1,412,586 | Welch | Apr. 11, 1922 |
| 2,268,925 | Cooper | Jan. 6, 1942 |
| 2,621,101 | Cooper | Dec. 9, 1952 |
| 2,733,008 | D'Andrea et al. | Jan. 31, 1956 |
| 2,796,830 | Hilton | June 25, 1957 |
| 2,912,163 | Van Tuyl | Nov. 10, 1959 |
| 2,990,116 | Quinn et al. | June 27, 1961 |